United States Patent [19]
Hoffman

[11] 3,835,724
[45] Sept. 17, 1974

[54] AUXILIARY BICYCLE BRAKE DEVICE

[76] Inventor: William B. Hoffman, 67 Ships Point Ln., Oyster Bay, N.Y. 11771

[22] Filed: Aug. 29, 1973

[21] Appl. No.: 392,568

Related U.S. Application Data

[63] Continuation-in-part of Ser. No. 316,234, Dec. 18, 1972, Pat. No. 3,760,648.

[52] U.S. Cl................ 74/489, 74/471 R, 188/24
[51] Int. Cl................ B62l 3/02, G05g 13/00
[58] Field of Search............ 188/24; 74/471 R, 488, 74/489, 551.1

[56] References Cited
UNITED STATES PATENTS
| | | | |
|---|---|---|---|
| 2,899,835 | 8/1959 | Moveland | 74/481 |
| 3,403,577 | 10/1968 | Ozaki | 74/489 X |
| 3,760,648 | 9/1973 | Hoffman | 188/24 |

*Primary Examiner*—Trygve M. Blix
*Assistant Examiner*—Sherman D. Basinger
*Attorney, Agent, or Firm*—Frank J. Jordan

[57] ABSTRACT

A braking device for use on a bicycle handle of the type used on racing bicycles which consists of an auxiliary brake located in a position to be grasped by a bicycle rider while having his hands on the cross bar of the bicycle handle bar rather than on the end handles. The auxiliary brake is mounted in position by flexible mounting means which flexibly connect the auxiliary brake to the pivotal brake handle levers, whereby the auxiliary brake may be grasped by a rider to apply the brakes while the rider has his hands on the cross bar or other locations of the bicycle handle.

12 Claims, 6 Drawing Figures

PATENTED SEP 17 1974     3,835,724

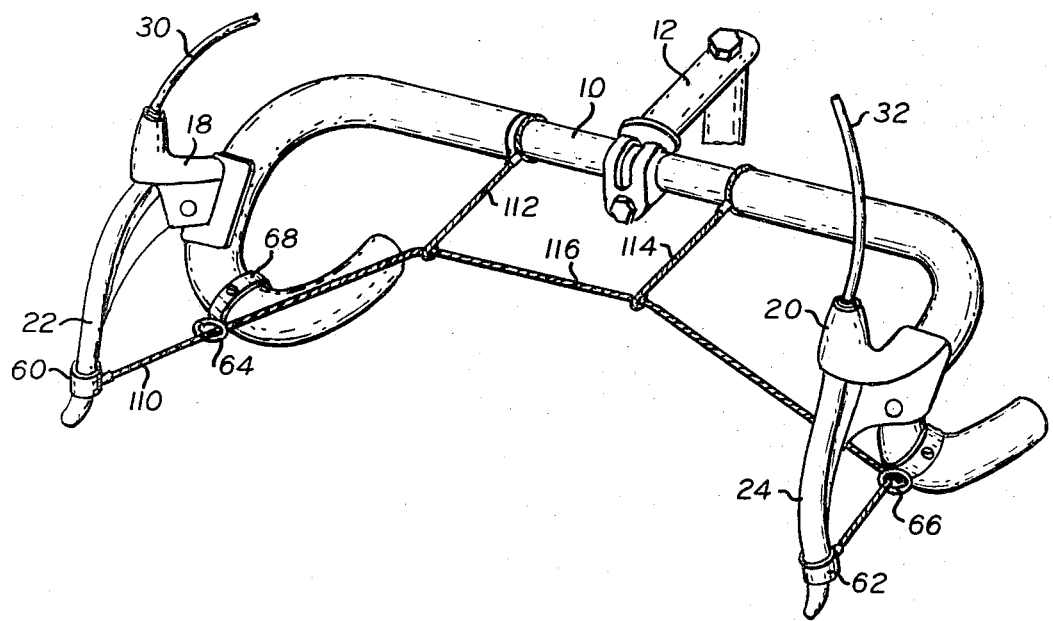

AUXILIARY BICYCLE BRAKE DEVICE

This application is a continuation-in-part application of copending application Ser. No. 316,234 filed Dec. 18, 1972, now U.S. Pat. No. 3,760,648.

BACKGROUND OF THE INVENTION

The present invention relates to a device for operating a brake of a bicycle and more particularly to an auxiliary brake which can be operated from various positions and which is interconnected to two conventional brake levers by flexible means.

Drop handles are frequently used on racing bicycles which run at high speeds. These drop handles consist of a substantially horizontal straight rod section or cross bar provided on the fork shaft and substantially U-shaped bent rod sections which extend forwardly form both ends of the cross bar. Brake levers are attached to the U-shaped bent rod sections which extend forwardly from both ends of the cross bar. Brake levers are attached to the U-shaped bent rod sections by means of brackets.

When running at high speed a rider will ordinarily grasp the U-shaped bent rod sections and in so doing will lean forwardly so as to minimize wind resistance. When leaning forward in this position the rider may easily extend his fingers to grasp the brake levers. However, when the rider is operating at a slower speed, for example when he becomes tired or is riding through traffic, he will want to sit straight up in the bicycle seat. When he does this he can no longer conveniently grasp the U-shaped bent rod sections of the handle because they are too far away and he therefore places his hands on the top of the bicycle handle bar. This position presents a potentially unsafe condition in that the rider is no longer able to reach the brake levers by extending his fingers. In order for the rider to apply the brakes he must remove his hands from the top of the bar and reach to the side and forwardly in order to grasp the brake levers. The necessity of having to reach for the brake levers in this manner results in a delay which might cause a mishap or accident.

In U.S. patent application Ser. No. 316,234 filed Dec. 18, 1972, now U.S. Pat. No. 3,760,648, in the name of William B. Hoffman (who is also the applicant in the instant patent application) there is disclosed an auxiliary brake which may be grasped by a rider while having his hands on a cross bar or other locations of the bicycle handle. However, in the aforementioned patent application, there is disclosed a rigid cross-bar which extends transversly of the bicycle and which is connected to the two brake levers. When utilizing a rigid cross bar, it is necessary to make provisions in the connection between the rigid cross bar and the brake levers to insure that there will be a connection which will provide a rotational engagement so that there will be relative rotational movement between the rigid cross bar and the brake lever otherwise it would not always be possible to apply equal brake pressure to both brake levers. In the aforementioned patent application, a rotary connection was provided between the brake lever and the cross bar. However, this rotary connection increased the overall expense and tended to complicate the arrangement and its installation.

Accordingly, an object of the present invention is to overcome the disadvantages of known prior art arrangements and provide an auxiliary brake which may be readily and conveniently operated from various positions on the bicycle handle and which may be grasped by the rider by extending the fingers of one or both hands.

Another object of the present invention is to provide an auxiliary brake arrangement in which both brake levers may be operated through a flexible connecting arrangement. Another object of the present invention, according to one embodiment, is to eliminate the need for a rigid cross bar and to provide an inexpensive and easily installed auxiliary brake.

A further object of the present invention is to provide an attachment between an auxiliary brake and the brake levers which provides for flexibility, whereby the brakes may be applied independently of the differences in required pivotal movement of each brake lever when the brakes are applied.

Other features which are considered as characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood form the following description of specific embodiments when read in connection with the accompanying drawings.

BRIEF DESCRIPTION OF THE DRAWINGS

FIG. 6 is a perspective view of an auxiliary brake according to another embodiment of the invention.

DESCRIPTION OF THE PREFERRED EMBODIMENTS

Before explaining the present invention in detail, it is to be understood the invention is not limited in its application to the details of construction and arrangement of parts illustrated in the accompanying drawings, since the invention is capable of other embodiments and of being practiced or carried out in various ways. Also, it is to be understood that the phraseology or terminology is for the purpose of description and not of limitation.

Figure 1:
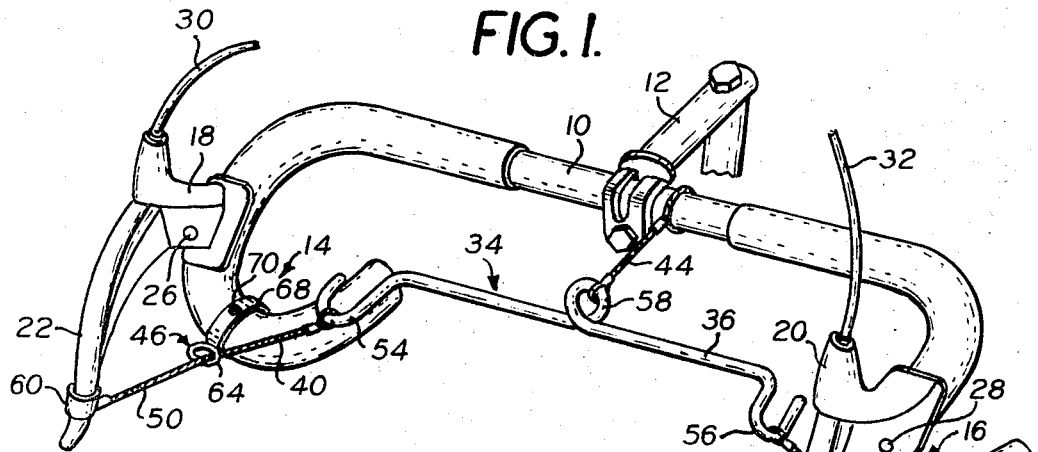
FIG. 1 is a perspective view of a drop handle as used on a racing bicycle and showing an auxiliary brake according to one embodiment of the present invention.

Referring to the drawings, FIG. 1 shows a conventional drop handle having a straight rod section or cross bar 10 secured to the fork 12 of a bicycle. U-shaped handle sections 14 and 16 are carried on the longitudinal ends of the cross bar 10. Support brackets 18 and 20 are secured to the U-shaped handle sections 14, 16 and pivotally mounted brake levers 22 and 24 extend from the brackets 18 and 20 respectively. It will be noted that the brake levers 22, 24 are located such that they may be readily grasped to apply the brakes when the rider has his hands on the U-shaped handle sections 14 and 16. The brake levers 22, 24 are pivoted at 26, 28 to actuate wire connectors 30, 32 which actuate braking elements (not shown) in a known manner.

According to the present invention, auxiliary brake handle means 34 is located to permit the brakes to be readily applied when the rider has his hands on the top of the handle bar 10 of the bicycle. The auxiliary handle means 34 comprises a cross member 36 which is supported, by means to be described, so that the cross bar 36 is disposed adjacent to the handle bar 10 so that a rider who has his hands on the handle bar 10 may readily extend his fingers to grasp the cross bar 36 to pull the latter toward him and thereby apply the brakes.

The cross bar 36 is supported by three flexible means 40, 42 and 44 such as wires, cables or leather thongs. Thus, the end portions of the cross bar 36 are supported by the flexible means 40 and 42 each of which is attached to the end portions of the pivotally mounted brake levers 22 and 24 respectively. Guide means 46, 48 are provided on the handle bar to guide the flexible means 40, 42 at an intermediate section between its connection to the auxiliary cross bar 36 and to the brake levers 22, 24. The guide means 46, 48 serve to position a first portion 50, 52 of each of the flexible means 40, 42 respectively in a longitudinal extending position which is generally parallel to the front-to-rear axis of the bicycle for reasons that will be described hereinafter.

The cross bar 36 has U-shaped ends 54, 56 and a central loop 58 which is supported by the flexible means 44 attached to the handle bar 10 or fork 12.

With the above arrangement, it will be seen that a rider who is riding a bicycle with his hands on the top of the bar 10 can readily, by means of his fingers, apply the front and rear brakes quickly without having to move his arms or change position of his hands. It will further be seen that the auxiliary brake means 34 may be easily mounted on existing bicycles of various sizes inasmuch as the adjustments may be made in the auxiliary brake to provide for varing spacing between the two brake levers 22, 24 and between the latter and the cross bar 34.

The flexible means 40, 42 may be attached to the brake levers 22, 24 by various means. For example, in FIG. 1 collars 60, 62 may be slipped over the ends of the brake handles 22, 24 and the flexible means 40, 42 may be affixed and extend from the longitudinal sidewall of the collars 60, 62 respectively. The collar 60, 62 may be made of a resilient material such as rubber so that the collars may be resiliently forced into position on the brake levers 22, 24 to resiliently hold itself on the latter. In order to prevent the brake levers 22, 24 from being pulled laterally to one side and thereby impairing the effective operation of the brake levers, the guide means 46, 48 which include loop elements 64, 66 serve to dispose the first portion 50 and 52 of the flexible means in a disposition generally parallel to the front-to-rear axis of the bicycle. Thus with the guide means 46, 48 properly positioned on the handle bars, the first portions 50, 52 of the flexible means will be generally parallel to the front-to-rear axis of the bicycle and thereby prevent the brake lever from being pulled laterally to one side when the brakes are applied.

The guide means 46 include a collar 68 secured on the bicycle handle. The collar 68 may have a set screw 70 to secure its position on the handle. It will be seen in FIG. 1 that the collar is provided with the previously mentioned loop elements 64, 66 through which the flexible means are slideably guided. It will also be observed since the flexible means 40, 42 are attached to each brake lever 22, 24 respectively, the rider may control the pressure and apply equal pressure to both brake levers 22, 24 inasmuch as the flexible means 40, 42, in effect, provides for independent operation of each brake lever 22, 24.

Figure 2:
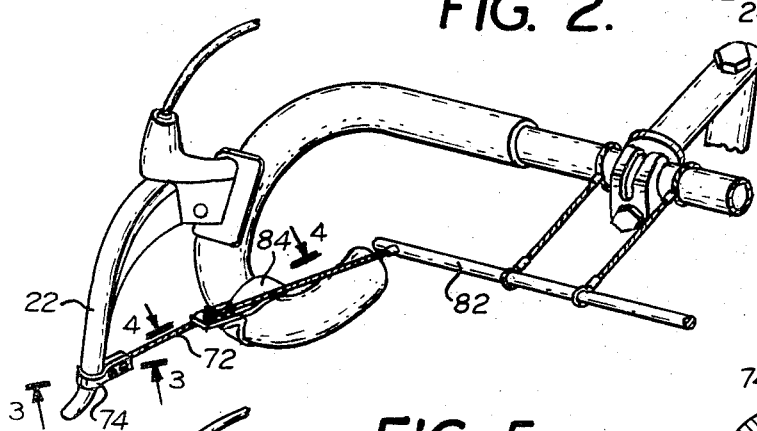
FIG. 2 is a partial perspective view of an auxiliary brake according to another embodiment of the invention.
Figure 3:
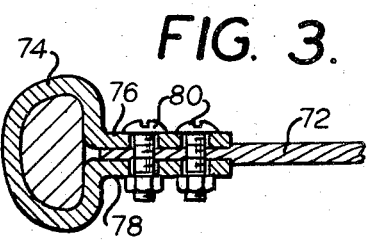
FIG. 3 is a partial sectional view taken along the line 3—3 in FIG. 2.

FIG. 2 shows an alternate arrangement in which the flexible means in the form of a cable 72 is attached to the brake lever 22 by a generally U-shaped clamp 74 which fits over the brake lever 22 and which has leg portions 76, 78 which are secured together by a fastening means 80 as shown in FIG. 3. Thus the cable 72 may be secured between the two leg portions 76, 78 as the latter are clamped together by the fastening means 80. With this arrangement, the fastening means 80, are used to clamp the U-shaped clamp 74 in secured position on the brake lever 22 and also to secure the cable 72 to the clamp 74 and to the brake lever 22. In this embodiment the auxiliary handle 82 may be a straight rod as shown in FIG. 2.

Figure 4:
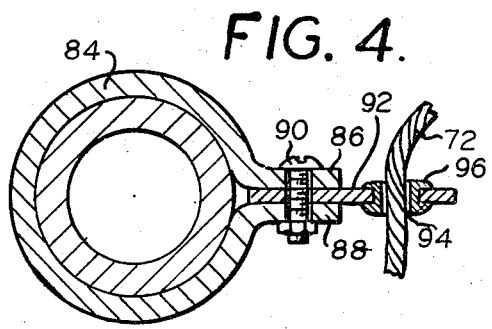
FIG. 4 is a partial sectional view taken along the line 4—4 in FIG. 2.

FIG. 4 shows a detailed arrangement for securing the guide 46 means to the handle bar. Thus the guide means 46 includes a U-shaped clamp 84 which encircles the handle bar and which also has two legs 86, 88 fastened by a fastening member 90. The clamp 84 has an extending portion 92 with an aperture 94 through which the cable 72 passes. It will be seen that the fastening means 90 secures the clamp 84 and the extending portion 92 to the handle bar in the desired position. Thus, the fastening means 90, when tightened, applies a pressure to the clamp 84 to securly grasp the handle bar and position the aperture 94 on the extending means 92 in the desired position where it is maintained to insure that the cable 72 will be guided along a front-to-rear disposition hereinbefore setforth. As may be desired, an insert means 96 of different material such as plastic or the like to lessen friction may be inserted in the aperture 94 within the extending means 92. A wheel may also be used for such purpose.

Figure 5:
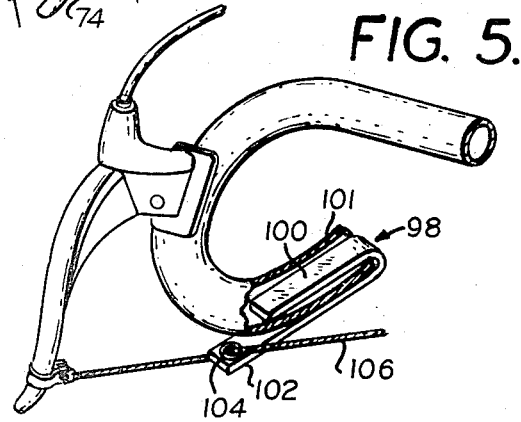
FIG. 5 is a partial perspective view of a drop handle and auxiliary brake according to another embodiment of the invention.

FIG. 5 shows a further alternate embodiment in which the guide means is secured by providing a U-shaped holder 98 having one leg 100 which fits into the handle bar 101 far enough so that it fixes itself in the curve and another leg 102 which extends on the outside and parallel to the handle bar 101 and which has an aperture 104 through which the cable 106 passes to guide the latter.

FIG. 6 shows a further alternate embodiment in which a continuous flexible means 110 runs or extends from the brake lever 22 to pass through a loop element 64 of the guide means and then extends in front of the cross bar 10 where it is supported by two support elements 112, 114. The flexible means 110 then continues to the other brake lever 24 after having passed through the loop element 66 of the guide means. Thus the portion 116 of the flexible means 110 is disposed in a position to be grasped by the fingers of a rider who has his hands on the cross bar 10. The flexible means 110 which may be a cable, plastic, or other elongated element is secured to the brake levers 22, 24 as previously described. The support elements 112, 114 may comprise thongs, straps, cables or the like.

While the invention has been described by means of specific examples and in specific embodiments, it is not intended to be limited thereto, for obvious modifications will occur to those skilled in the art without departing from the spirit and scope of the invention.

What is claimed is:

1. A braking device for use on a racing bicycle handle of the type having a cross bar and handle portions at the ends of said cross bar extending generally transversely of said cross bar and on which pivotal brake handle levers are mounted, comprising auxiliary brake means extending adjacent to said cross bar, said auxiliary brake means including flexible mounting means in the form of an elongated flexible element flexibly suspending said auxiliary brake means from said brake handle levers, whereby said auxiliary brake means may be grasped by a rider to apply the brakes while the rider has his hands on said cross bar or other locations of the bicycle handle.

2. A braking device according to claim 1 wherein said auxiliary brake means comprises a rigid cross member, said elongated flexible element being secured to and extending between said brake handle levers and said rigid cross member.

3. A braking device according to claim 2 wherein said flexible mounting means are cables.

4. A braking device according to claim 1 including guide means secured to said bicycle handle portions for guiding said elongated flexible element.

5. A braking device according to claim 4 wherein said guide means slidably support said flexible mounting means.

6. A braking device according to claim 1 including clamping means for detachably clamping said flexible mounting means to said brake levers.

7. A braking device according to claim 1 including means for detachably clamping said guide means to said bicycle handle portions.

8. A braking device according to claim 1 including flexible support means for supporting said auxiliary brake means on said bicycle handle.

9. A braking device for use on a racing bicycle handle of the type having a cross bar and handle portions at the ends of said cross bar extending generally transversely of said cross bar and on which pivotal brake handle levers are mounted, comprising auxiliary brake means extending adjacent to said cross bar, said auxiliary brake means including flexible mounting means flexibly mounting said auxiliary brake means on said brake handle levers, and guide means secured to said bicycle handle portions for guiding said flexible mounting means, said guide means being positioned to guide a first portion of said flexible mounting means along a path extending generally parallel to the front-to-rear axis of the bicycle so that said brake levers will be pivoted and pulled by said flexible mounting means in a direction generally parallel to said front-to-rear axis of said bicycle, whereby said auxiliary brake means may be grasped by a rider to apply the brakes while the rider has his hands on said cross bar or other locations of the bicycle handle.

10. A braking device for use on a racing bicycle handle of the type having a cross bar and hollow handle portions at the ends of said cross bar extending generally transversely of said cross bar and on which pivotal brake handle levers are mounted, comprising auxiliary brake means extending adjacent to said cross bar, said auxiliary brake means including flexible mounting means flexibly mounting said auxiliary brake means on said brake handle levers, and guide means secured to said bicycle handle portions for guiding said flexible mounting means, said guide means including a generally U-shaped clamp element having one leg thereof disposed in a hollow end section of said hollow handle portion to provide a means for securing said guide means in position on said bicycle handle, whereby said auxiliary brake means may be grasped by a rider to apply the brakes while the rider has his hands on said cross bar or other locations of the bicycle handle.

11. A braking device for use on a racing bicycle handle of the type having a cross bar and handle portions at the ends of said cross bar extending generally transversely of said cross bar and on which pivotal brake handle levers are mounted, comprising auxiliary brake means in the form of an elongated flexible element extending adjacent to said cross bar, said auxiliary brake means including flexible mounting means flexibly mounting said auxiliary brake means on said brake handle levers, said flexible mounting means comprising elongated flexible members forming continuations of said elongated flexible element, whereby said auxiliary brake means may be grasped by a rider to apply the brakes while the rider has his hands on said cross bar or other locations of the bicycle handle.

12. A braking device according to claim 11 wherein said flexible element and said flexible members are formed by a single cable.

* * * * *